United States Patent [19]

Shinozaki

[11] 4,369,891

[45] Jan. 25, 1983

[54] STRUCTURE OF A BREATHER PIPE FOR GASOLINE TANKS

[75] Inventor: Nobuya Shinozaki, Mooka, Japan

[73] Assignee: Kato Hatsujo Kaisha, Ltd., Yokohama, Japan

[21] Appl. No.: 259,057

[22] Filed: Apr. 30, 1981

[30] Foreign Application Priority Data

Aug. 30, 1980 [JP] Japan .............................. 55-123216[U]

[51] Int. Cl.³ ............................................ B65D 90/28
[52] U.S. Cl. ................................. 220/85 VR; 285/157
[58] Field of Search .......... 220/85 VR, 85 VS, 86 R; 261/72 R, ; 123/519; 285/157, 423; 280/5 A

[56] References Cited

U.S. PATENT DOCUMENTS 3,774,803 11/1973 Bombardier .
4,166,550 9/1979 Kleinschmit et al. ......... 220/85 VR
4,261,151 4/1981 Ito ..................................... 24/214 X Primary Examiner—Steven M. Pollard
Assistant Examiner—David Voorhees
Attorney, Agent, or Firm—Wenderoth, Lind & Ponack

[57] ABSTRACT

The improved structure of a breather pipe for a gasoline tank comprises synthetic resin pipes constituting the straight portions of the breather pipe and connecting members constituting the bending portions of the breather pipe. The connecting members are molded of a synthetic resin and each comprise in integral combination a base, shoulder portions extended downwardly from the opposed sides of the base, internally communicating connecting arms formed as a whole in the shape of a letter "V", "U" or the like and disposed on the upper portion of the base, a zigzag arrangement keeping leg extended from the lower surface of the base through the medium of a reinforcing rib 17 and provided with projecting pawls which upwardly project outwardly from the lower end of the leg and which have at the leading ends thereof stepped portions being engaged with the edge of a hole bored in advance in a proper place of a given panel and being adapted to hold the panel in co-operation with the shoulder portions.

3 Claims, 6 Drawing Figures

STRUCTURE OF A BREATHER PIPE FOR GASOLINE TANKS

BACKGROUND OF THE INVENTION

This invention relates to an improved structure of a breather pipe through which a gasoline vapor generated in a gasoline tank is circulated, cooled in the circulating process and recovered again into the gasoline tank.

There have heretofore been proposed various breather pipes for gasoline tanks. Generally, the conventional breather pipe comprises connecting members of a metal which constitute bending portions and synthetic resin pipes which constitute straight portions. Due to the material of which the connecting members are made, the breather pipe has disadvantages in that the treatments for bending a metal and for plating the metal so as to give corrosion resistance thereto are required to obtain connecting members and in that means made of a material other than metals for retaining the breather pipe constantly in a zigzagged state must be attached to the synthetic resin pipes and fixed to a given panel, thereby bringing about various problems from an economical point of view and complication in field work.

SUMMARY OF THE INVENTION

The present invention has been accomplished in view of these disadvantages.

One object of the present invention is to provide a structure of a breather pipe wherein connecting members constituting the bending portions of a breather pipe are molded of a synthetic resin easy to work and used not only as the connecting means but also as means for keeping the breather pipe in a zigzagged state.

To attain the object described above according to the present invention, there is provided a structure of a breather pipe for a gasoline tank comprising, in integral combination, synthetic resin pipes constituting straight portions of the breather pipe; and connecting members each molded of a synthetic resin and each comprising a base, a pair of internally communicating connecting arms disposed on the upper surface of the base for being inserted into the synthetic resin pipes, and a zigzag arrangement keeping leg extended downwardly from the lower surface of the base and provided with a pair of projecting pawls upwardly projecting outwardly from the lower end of the leg and having stepped portions formed on the leading ends thereof for coming into fast engagement with the edge of a hole bored in advance in a given panel.

The other objects and characteristic features of the present invention will become apparent from a further disclosure of the invention to be given hereinafter with reference to the accompanying drawings.

DESCRIPTION OF THE PREFERRED EMBODIMENT

Figure 1:
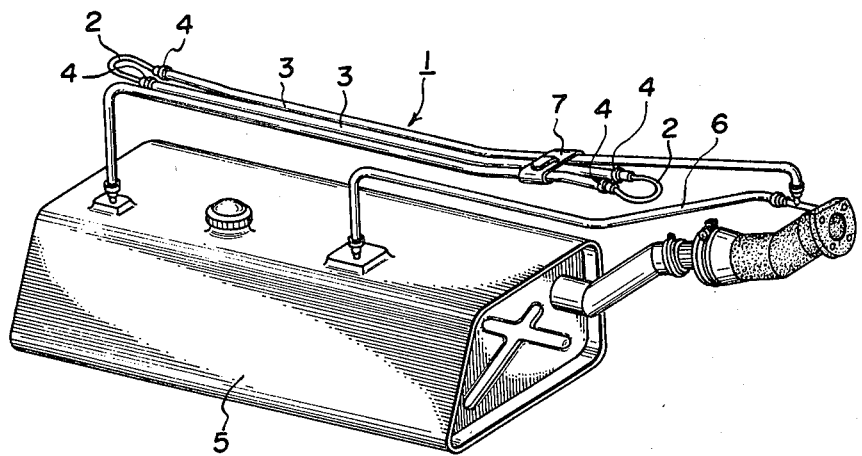
FIG. 1 is a general perspective view illustrating the structure of a conventional breather pipe.
Figure 2:
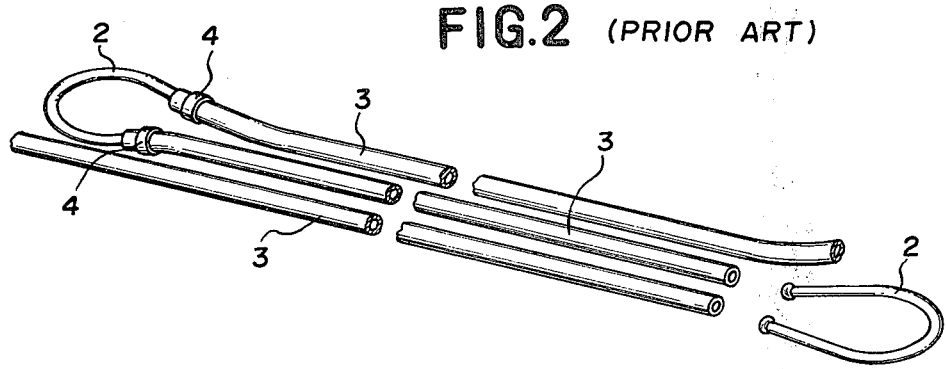
FIG. 2 is a partially disassembled perspective view of an essential part of the conventional breather pipe.

With reference to FIGS. 1 and 2, the conventional breather pipe 1 comprises metal pipes 2 which are U-shaped connecting members constituting bending portions and long synthetic resin pipes 3 constituting straight portions and fitted to the respective connecting ends of the metal pipes 2 through the media of clamps 4. The breather pipe thus constructed is connected at both ends thereof directly to or indirectly through another pipe 6 to the upper portion of a gasoline tank 5, disposed above the gasoline tank and supported with one or more clips 7 in proper places of the synthetic resin pipes except for the metal pipes 2 so as to be kept in a zigzagged state. The clips 7 are fixed in proper places on an adjacent given panel (not shown). In such conventional structure, since the metal pipes 2 are used as the bending portions of the breather pipe 1, there have remained various disadvantages as described previously.

Now, the present invention will be described in detail hereinafter with reference to the embodiment shown in the drawings.

Figure 3:
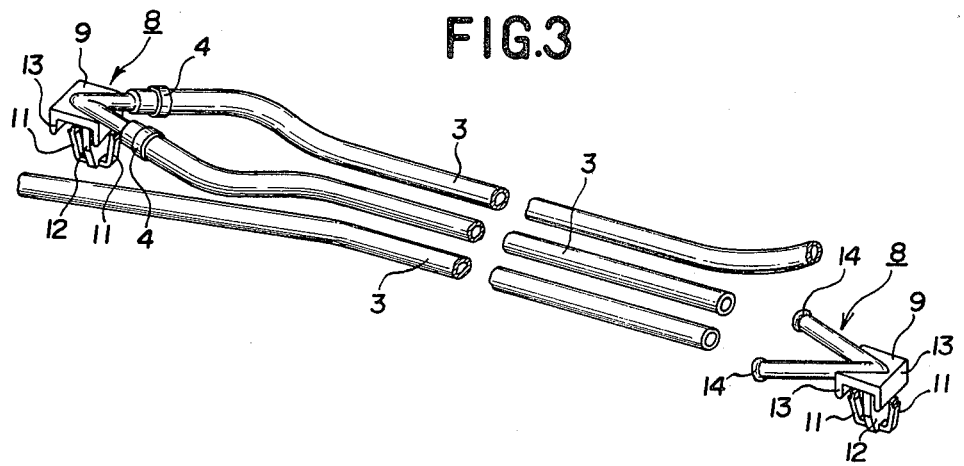
FIG. 3 is a perspective view of an essential part illustrating the structure of a breather pipe according to the present invention as partially disassembled.
Figure 4:
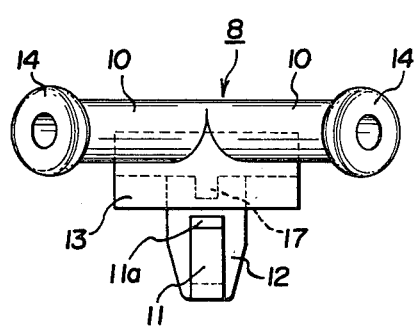
FIG. 4 is a front view illustrating a connecting member of the breather pipe according to the present invention.
Figure 5:
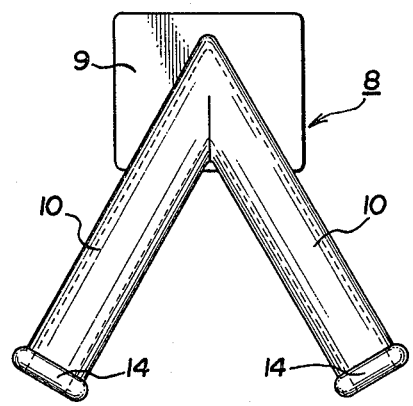
FIG. 5 is a plan view of the connecting member.

As shown in FIGS. 3 to 5, a connecting member 8 according to the present invention is integrally molded of a gasoline-proof synthetic resin. To be specific, the connecting member 8 comprises, in integral combination, a base 9, shoulder portions 13, 13 extended downwardly from the opposed sides of the base, internally communicating connecting arms 10, 10 formed as a whole in the shape of a letter "V", "U" or the like and disposed on the upper portion of the base 9, a zigzag arrangement keeping leg 12 extended from the lower surface of the base through the medium of a reinforcing rib 17 and provided with projecting pawls 11, 11 which upwardly project outwardly from the lower end of the leg 12 and which have at the leading ends thereof stepped portions 11a, 11a being engaged with the edge of a hole bore in advance in a proper place of a given panel described afterward and being adapted to hold the panel in cooperation with the shoulder portions 13, 13. Further, an expanded diameter portion 14 for increasing the fastening force of a clamp 4 in being fitted to a synthetic resin pipe 3 is integrally formed in a proper place on the outer periphery of the connecting arm 10.

Figure 6:
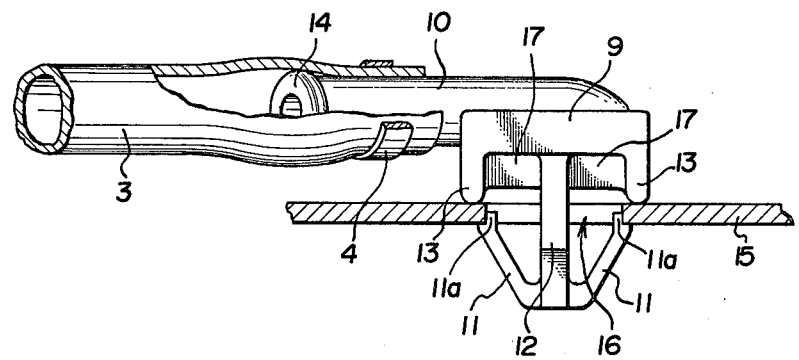
FIG. 6 is a side view of the connecting member as fixed to a given panel.

Therefore, in the present invention, when the respective connecting arms 10 of the connecting members 8 and the synthetic resin pipes 3 are successively connected with each other through the media of the clamps 4, the breather pipe 1 is zigzagged in the same manner as in the conventional one and, when the leg 12 provided with the pawls 11 and suspended in the lower portion of the connecting member 8 is inserted into a hole 16 bored in a given panel 15 adjacent to the gasoline tank 5, as shown in FIG. 6, the pawls 11 are deformed by their own resiliency and pass through the hole, the panel 15 is held and pressed by the stepped portions 11a at the leading ends of the respective pawls 11, and the shoulder portions 13 prevent the leg 12 from being pulled off in the reverse direction and, therefore, the zigzag arrangement of the breather pipe 1 can positively be kept. The connection between the connecting members and the synthetic resin pipes may be accomplished by an adhesive agent.

As described above, in the present invention, as the connecting members constituting the respective bending portions of the zigzagged breather pipe are molded of a synthetic resin in place of a metal, such bending and plating treatments for obtaining the connecting members as in the conventional breather pipe are not required at all, thereby rendering the cost extremely low, and since the leg which is not pulled off in the reverse direction when it has been inserted into the hole bored in the given panel is integrally provided on the connecting member, the connecting member can also be used as means for keeping the zigzag arrangement of the breather pipe and, therefore, such clip members as required in the conventional breather pipe are not required, with the result that the work of fitting the clip members to the synthetic resin pipes can be omitted and the field work can greatly be rationalized.

What is claimed is:

1. In a structure of a breather pipe for a gasoline tank comprising connecting members constituting bending portions of said breather pipe and synthetic resin pipes constituting straight portions of said breather pipe which are successively connected to each other to be held in a zigzagged state and disposed above said gasoline tank, the improved structure characterized by said connecting members each molded of a synthetic resin and each comprising a base, a pair of internally communicating connecting arms disposed on the upper surface of said base for being inserted into said synthetic resin pipes, and a zigzag arrangement keeping leg extended downwardly from the lower surface of said base and provided with a pair of projecting pawls upwardly projecting outwardly from the lower end of said leg and having stepped portions formed on the leading ends thereof for coming into fast engagement with the edge of a hole bored in advance in a given panel.

2. The improved structure according to claim 1, wherein said pair of internally communicating connecting arms are formed as a whole in a "V" shape and provided on the peripheries thereof one each with an expanded diameter portion for causing a force for fastening said synthetic resin pipes and said connecting members to be further strengthened.

3. The improved structure according to claim 1 or 2, further comprising a pair of shoulder portions integrally projecting downwardly from the opposed sides of said base and functioning, in cooperation with said stepped portions of said pair of projecting pawls, to interpose and panel under pressure between said shoulder portions and said stepped portions.

* * * * *